US008176517B2

(12) United States Patent
Hawkins et al.

(10) Patent No.: US 8,176,517 B2
(45) Date of Patent: May 8, 2012

(54) AUTOMATIC DISPLAY OF NEW PROGRAM INFORMATION DURING CURRENT PROGRAM VIEWING

(75) Inventors: Bret David Hawkins, Brownsburg, IN (US); James Duane Tenbarge, Fishers, IN (US)

(73) Assignee: Thomson Licensing, Boulogne Billancourt (FR)

( * ) Notice: Subject to any disclaimer, the term of this patent is extended or adjusted under 35 U.S.C. 154(b) by 318 days.

(21) Appl. No.: 10/577,267

(22) PCT Filed: Nov. 1, 2004

(86) PCT No.: PCT/US2004/036275
§ 371 (c)(1),
(2), (4) Date: Apr. 26, 2006

(87) PCT Pub. No.: WO2005/048589
PCT Pub. Date: May 26, 2005

(65) Prior Publication Data
US 2007/0136749 A1    Jun. 14, 2007

Related U.S. Application Data

(60) Provisional application No. 60/518,218, filed on Nov. 7, 2003.

(51) Int. Cl.
*H04N 7/10*      (2006.01)
*H04N 7/025*     (2006.01)
*H04N 7/16*      (2011.01)
*G06F 3/00*      (2006.01)
*G06F 13/00*     (2006.01)

(52) U.S. Cl. .............. 725/50; 725/40; 725/43; 725/131; 725/139; 725/151

(58) Field of Classification Search .................... 725/39, 725/40, 43, 50, 58, 68, 131, 139, 151
See application file for complete search history.

(56) References Cited

U.S. PATENT DOCUMENTS 5,589,892 A * 12/1996 Knee et al. ............... 725/43
5,801,785 A    9/1998 Crump et al.
5,841,433 A * 11/1998 Chaney ..................... 725/50
(Continued)

FOREIGN PATENT DOCUMENTS
CN    1298603    6/2001
(Continued)

OTHER PUBLICATIONS

Search report dated Mar. 8, 2005.

*Primary Examiner* — Brian Pendleton
*Assistant Examiner* — Pinkal R Chokshi
(74) *Attorney, Agent, or Firm* — Robert D. Shedd; Joseph J. Opalach; Reitseng Lin (57) ABSTRACT

A method and apparatus for automatic display of next or future television program information when tuned to a television channel. Acquired or received program information for a television program to be shown next or later on the currently tuned television channel is automatically displayed on the currently tuned channel. In this manner, a viewer is provided with information regarding a next or future television program on the television channel currently being watched without active intervention by the viewer. According to an aspect of the invention, if a new or next television program guide or program information (update) is received before the end of a current television program, the television apparatus automatically updates the display of program information according to the information included in the newly received program guide.

20 Claims, 7 Drawing Sheets

U.S. PATENT DOCUMENTS

| | | | |
|---|---|---|---|
| 6,208,799 B1* | 3/2001 | Marsh et al. | 386/292 |
| 6,243,145 B1* | 6/2001 | Schlarb et al. | 725/39 |
| 6,271,893 B1* | 8/2001 | Kawaguchi et al. | 348/725 |
| 6,331,877 B1* | 12/2001 | Bennington et al. | 348/731 |
| 6,396,531 B1* | 5/2002 | Gerszberg et al. | 348/14.01 |
| 6,400,406 B1* | 6/2002 | Kim | 348/460 |
| 6,418,556 B1* | 7/2002 | Bennington et al. | 725/40 |
| 6,486,920 B2* | 11/2002 | Arai et al. | 348/563 |
| 6,536,041 B1* | 3/2003 | Knudson et al. | 725/39 |
| 6,637,029 B1* | 10/2003 | Maissel et al. | 725/46 |
| 6,701,526 B1* | 3/2004 | Trovato | 725/39 |
| 6,763,522 B1* | 7/2004 | Kondo et al. | 725/39 |
| 6,925,650 B1* | 8/2005 | Arsenault et al. | 725/39 |
| 6,934,965 B2* | 8/2005 | Gordon et al. | 725/54 |
| 6,996,627 B1* | 2/2006 | Carden | 709/237 |
| 7,212,729 B2* | 5/2007 | Nakajima et al. | 386/291 |
| 7,266,835 B2* | 9/2007 | Halbert | 725/60 |
| 7,389,525 B2* | 6/2008 | Sullivan | 725/50 |
| 7,434,247 B2* | 10/2008 | Dudkiewicz et al. | 725/46 |
| 7,523,476 B2 | 4/2009 | Tsukamoto et al. | |
| 7,530,087 B2* | 5/2009 | Akhavan et al. | 725/43 |
| 7,620,965 B2* | 11/2009 | Miyazaki et al. | 725/42 |
| 7,661,119 B1* | 2/2010 | Arsenault et al. | 725/48 |
| 8,028,315 B1* | 9/2011 | Barber | 725/47 |
| 2001/0030711 A1 | 10/2001 | Saito | |
| 2002/0040482 A1* | 4/2002 | Sextro et al. | 725/136 |
| 2002/0100048 A1* | 7/2002 | Yang et al. | 725/47 |
| 2002/0104081 A1* | 8/2002 | Candelore et al. | 725/9 |
| 2002/0188944 A1* | 12/2002 | Noble | 725/39 |
| 2002/0194599 A1* | 12/2002 | Mountain | 725/39 |
| 2003/0083533 A1* | 5/2003 | Gerba et al. | 585/367 |
| 2003/0210353 A1 | 11/2003 | Jeong et al. | |
| 2004/0003406 A1* | 1/2004 | Billmaier | 725/60 |
| 2004/0078817 A1* | 4/2004 | Horowitz et al. | 725/58 |
| 2004/0128317 A1* | 7/2004 | Sull et al. | 707/104.1 |
| 2004/0267943 A1* | 12/2004 | Ryu | 709/228 |
| 2005/0071887 A1* | 3/2005 | Yoshida | 725/135 |
| 2005/0193415 A1* | 9/2005 | Ikeda | 725/49 |
| 2005/0198668 A1* | 9/2005 | Yuen et al. | 725/47 |
| 2005/0229233 A1* | 10/2005 | Zimmerman et al. | 725/135 |
| 2006/0053451 A1* | 3/2006 | Lockrige et al. | 725/50 |
| 2008/0178221 A1* | 7/2008 | Schein et al. | 725/42 |
| 2008/0307460 A1* | 12/2008 | Knudson et al. | 725/50 |
| 2009/0070815 A1* | 3/2009 | Barrett et al. | 725/43 |
| 2009/0119714 A1* | 5/2009 | Schlarb et al. | 725/56 |
| 2009/0241144 A1* | 9/2009 | LaJoie et al. | 725/40 |
| 2010/0154000 A1* | 6/2010 | Macrae et al. | 725/41 |
| 2010/0223642 A1* | 9/2010 | Knudson et al. | 725/41 |
| 2011/0162010 A1* | 6/2011 | Ellis et al. | 725/40 |

FOREIGN PATENT DOCUMENTS

| | | |
|---|---|---|
| EP | 0447968 | 9/1991 |
| EP | 1148670 | 10/2001 |
| EP | 1263211 | 4/2002 |
| JP | 2000-165763 | 6/2000 |
| JP | 2000-286733 | 10/2000 |
| JP | 2001-24959 | 1/2001 |
| JP | 2001-186436 A | 7/2001 |
| JP | 2001-257953 | 9/2001 |
| JP | 2001-285747 A | 10/2001 |
| JP | 2003-209760 | 7/2003 |
| KR | 10-0234653 | 12/1999 |
| WO | WO99/56473 | 11/1999 |

* cited by examiner

AUTOMATIC DISPLAY OF NEW PROGRAM INFORMATION DURING CURRENT PROGRAM VIEWING

This application claims the benefit, under 35 U.S.C. §365 of International Application PCT/US04/36275 filed Nov. 1, 2004, which was published in accordance with PCT Article 21(2) on May 26, 2005 in English and which claims the benefit of U.S. provisional patent application No. 60/518,218 filed Nov. 7, 2003.

BACKGROUND OF THE INVENTION

1. Field of the Invention

The present invention relates to the field of television and, more particularly, to the automatic display of information regarding a next or future program on a currently tuned television channel.

2. Background Information

It is now commonplace for televisions to receive and process television programming information for a plurality of television channels. Television programming information is typically provided along with a television program signal. This information may be assembled by the television into a program guide. Television programming information may alternatively be provided through program guide data provided on one or more of the television channel signals either as a single guide or separate pieces thereof.

The program guide is displayable on the television in response to user actuation of a command button or key, typically on a remote control of the television. Also, when a channel change is effected, program information for the channel being tuned is also typically displayed for a given amount of time. After the given amount of time, however, display of the program information ceases. The same or additional program information may again be displayed but only upon user actuation of a command button. Program information is thus provided automatically only when changing channels and only for the current program.

When a user wants to know the television programs that are available for the various television channels, the user must consult the program guide by actuation of a command button. The user must actively initiate a command to ascertain even the program coming up next on the same television channel.

Likewise, when a current program is about to end, a user cannot tell what the next program is even on the same channel without manually pressing a command key (e.g. the INFO key) on the remote or bring up the program information such as channel banner or manually entering a program guide to obtain the information.

It is thus evident from the above discussion that what is needed is a manner of providing program information about a next program for a television channel during viewing of a current television program.

It is thus further evident from the above discussion that what is needed is a manner of automatically providing program information about a next program during viewing of a current television program.

It is yet further evident from the above discussion that what is needed is a manner of automatically providing program information about a next program during viewing of a current television channel.

These needs and others are accomplished through application of the principles of the subject invention and/or as embodied in one or more various forms and/or structures such as are shown and/or described herein.

SUMMARY OF THE INVENTION

A method and apparatus is provided for display of next or future program information for a television channel when tuned to the television channel. Display of next or future program information is automatic when such program information is pushed to the program receiving apparatus.

In one form, the method and apparatus acquires or receives program information for a currently tuned television channel, the program information may or may not be automatically displayed during and/or after tuning of the particular television channel. Acquired or received program information for a television program to be shown next or later on the currently tuned television channel is automatically displayed on the currently tuned channel. In this manner, a viewer is provided with information regarding a next or future television program on the television channel currently being watched without active intervention by the viewer.

According to another form, if a new or next television program guide or program information (update) is received before the end of a current television program, the television apparatus automatically updates the display of program information according to the information included in the newly received program guide.

According to another form, when a television apparatus detects that a current television program is going to end within a particular time period, the television apparatus automatically acquires and displays program information for a next or future television program on the currently tuned television channel.

In a particular form, the invention is a method for displaying information of a next or future program by a television apparatus. The method includes the steps of: (a) receiving, by the television apparatus, program information; (b) determining, by the television apparatus, a next or future program of a currently tuned television channel from the received program information in response to receiving the program information; and (c) displaying information of the determined next or future program from the program information.

In another particular form, the invention is a television apparatus. The television apparatus includes storage configured for storing program information for television programs, and a controller configured for displaying program information of a next or future television program of a currently tuned television channel in response to the television apparatus receiving an update of the stored program information.

In yet another particular form, the invention is a television apparatus. The television apparatus includes means for storing program information for a plurality of television programs, and means for controlling display of program information of a next or future television program of a currently tuned television channel in response to the television apparatus receiving an update of the stored program information.

BRIEF DESCRIPTION OF THE DRAWINGS

The above mentioned and other features and objects of this invention, and the manner of attaining them, will become more apparent and the invention itself will be better understood by reference to the following description of an embodiment of the invention taken in conjunction with the accompanying drawings, wherein.

Corresponding reference characters indicate corresponding parts throughout the several views. Although the drawings represent embodiments of the invention, the drawings are not necessarily to scale and certain features may be exaggerated in order to better illustrate and explain the invention. The exemplifications set out herein illustrate various embodiments of the invention, but such exemplifications are not to be construed as limiting the scope of the invention in any manner.

DESCRIPTION OF THE PREFERRED EMBODIMENT

The embodiment disclosed herein is not intended to be exhaustive or limit the invention to the precise form disclosed so that others skilled in the art may utilize its teaching. For example, although displaying program information of a next program in a currently tuned channel is discussed below, the method and apparatus can display program information of any future program according to the principles of the invention.

Figure 1:
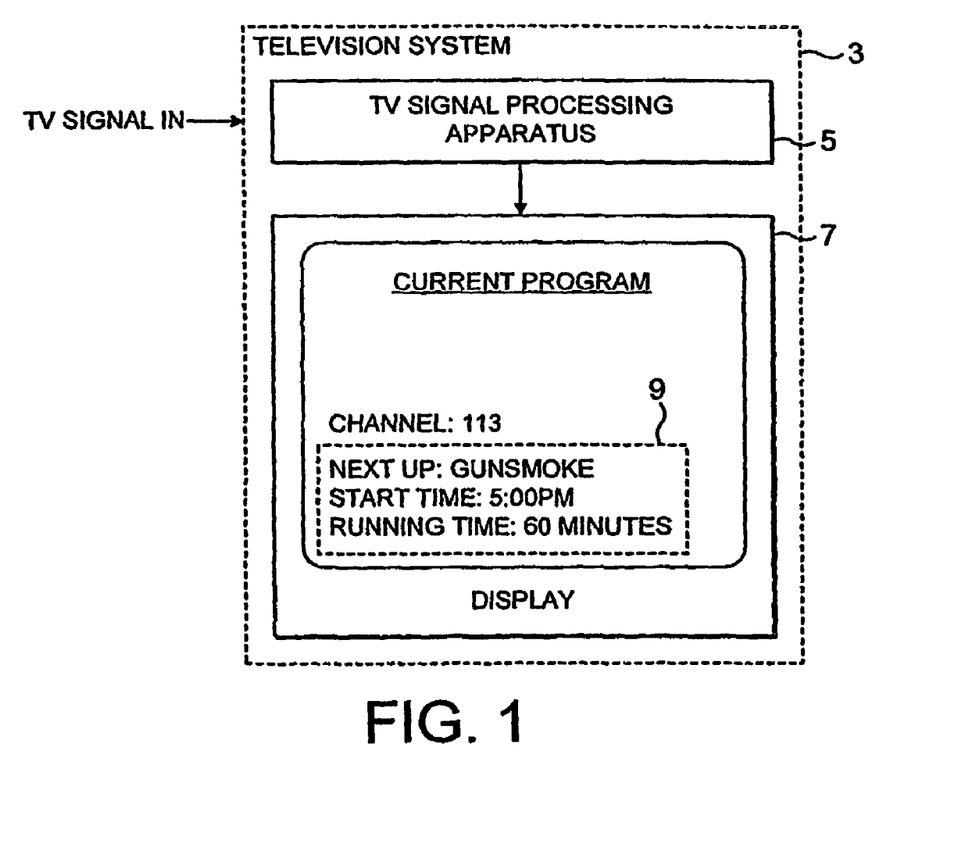
FIG. 1 shows a simplified block diagram of an exemplary television signal system operable to carry out the principles of the present invention.

FIG. 1 illustrates an exemplary television system 3 incorporating and/or operable according to the principles of the subject invention. As such, the television system 3 represents the many physical embodiments of the present invention. The television system 3 includes a television signal processing apparatus, television signal receiver or the like 5 and a display 7 that is operable in accordance with the principles of the subject invention. The principles of the subject invention may be embodied as or in the system 3 or as or in the television apparatus 5. For example, the system 3 may be embodied as a television (represented by the apparatus 5 and the display 7 in dashed outline), as a television apparatus 5 such as a set top box, satellite box, or the like. Hereinafter, the principles of the subject invention will be collectively described with reference to, but not limited by, the embodiment represented by the television apparatus 5.

The display 7 is depicted showing a Current Program of a currently tuned television channel i.e. channel 113. The display 7 is also depicted as presenting or displaying next program information in the form of a program banner 9. The program banner 9 or other manner of providing next program information in accordance with the principles of the subject invention provides information regarding next program data for the currently tuned television channel to use viewer automatically. The program banner 9 is shown providing the title of the program next up (i.e. Gunsmoke), the start time of the next program (i.e. 5:00 pm) and the running time of the next television program (i.e. sixty minutes). Other and/or more or less program information may be automatically provided in the display 9.

Figure 2:
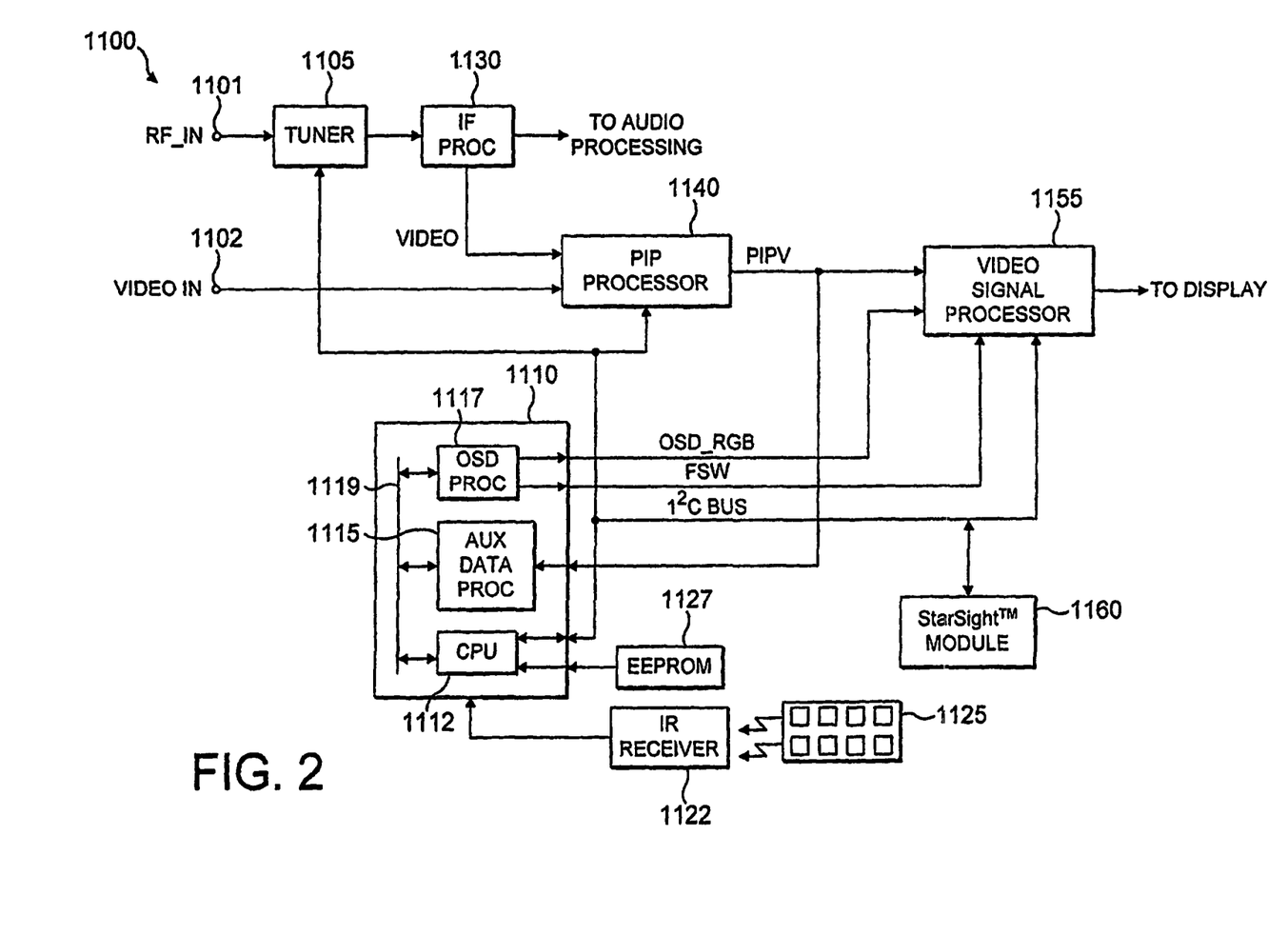
FIG. 2 shows a simplified block diagram of an exemplary television apparatus of the television signal system of FIG. 1 operable to carry out the principles of the present invention.

An exemplary television apparatus or television signal receiver 1100 operable in the manner according to the principles of the present invention is depicted in FIG. 2. Particularly, FIG. 2 depicts an exemplary television signal receiving apparatus or system suitable for processing television program signals and/or for performing in accordance with the principles espoused herein. The television apparatus 1100 shown in FIG. 2 is particularly capable of processing digital television signals (e.g. ATSC television signals), but may be capable of processing both digital television signals and analog television signals (e.g. NTSC television signals). The television system 1100 has one or more television signal inputs represented by RF_IN and VIDEO_IN. Each one of the one or more inputs is operable to receive television signals. The input format is as known in the art.

Particularly, a television apparatus, such as a television made by Thomson Inc. of Indianapolis, Ind., is operable to receive guide data from Gemstar® or PSIP (Program and System information Protocol) tables on ATSC (Advanced Television Systems Committee) streams. ATSC is a high definition television standards body. For illustration purposes, the PSIP data is used in the following discussion, but something similar could be accomplished with data from Gemstar®. Essentially, there is data in the PSIP EIT (Event Information Tables) which includes start and end times of a program or time information necessary for deriving the start and end times of the program. When the television apparatus receives and updates PSIP guide before the end of the current program, the television apparatus may display the new guide information (or next program data) to the user automatically. By automatically displaying this information, the user is no longer requited to manually bring up the channel banner or guide to ascertain the next program. Additionally, using this information, a television apparatus in accordance with the present principles, can detect that a current program is about to end in a predetermined time and pop the program information such as a channel banner with program title of a next program.

The apparatus 1100 of FIG. 2 has a first input 1101 for receiving television signal RF_IN at RF frequencies and a second input 1102 for receiving baseband television signal VIDEO IN. Signal RF_IN may be supplied from a source such as an antenna, cable system, satellite system or the like, while signal VIDEO IN may be supplied, for example, by a video recorder (VCR). The television apparatus 1100 may alternatively not have a VIDEO IN 1102 but may include more than one RF_IN 1101. Likewise, alternatively the apparatus 1100 may have other type of signal inputs as necessary and/or known in the art.

A tuner 1105 and IF processor 1130 operate in a conventional manner for tuning and demodulating a particular digital or analog television signal that is included in the incoming RF_IN. IF (intermediate frequency) processor 1130 produces baseband video signal VIDEO representing the video program portion of the tuned television signal. IF processor 1130 also produces a baseband audio signal that is coupled to an audio processing section (not shown in FIG. 2) for further audio processing. Although FIG. 2 shows input 1102 as a baseband signal, the television apparatus 1100 could include a second tuner and IF processor similar to units 1105 and 1130 for producing a second baseband video signal from either signal RF_IN or from a second RF signal source.

The system shown in FIG. 2 also includes a main microprocessor or, processor (mP or μP) 1110 for controlling components of the television apparatus 1100 such as the tuner 1105, picture-in-picture processing unit 1140, video signal processor 1155 and satellite (e.g. StarSight®) data processing module 1160 (other satellite data processing module or other television signal source data processing module). As used herein, the term "microprocessor" represents various devices including, but not limited to, microprocessors, microcomputers, microcontrollers, controllers, digital signal processors/controllers and the like. Microprocessor 1110 controls the system by sending and receiving both commands and data via serial data bus I²C BUS that utilizes the well-known I²C serial data bus protocol. More specifically, central processing unit (CPU) 1112 of the μP 1110 executes control programs contained within memory, such as EEPROM 1127 shown in FIG. 2 for operation of the television apparatus 1100 both as is typical for a television apparatus and/or particularly with respect to the principles of the subject invention, such as in response to commands provided by a user, e.g. via IR remote control 1125 and IR receiver 1122 or such as to enable/disable automatic banner display of a next television program in accordance with the present principles. For example, activation of a feature on remote control 1125 causes CPU 1112 to send a command along with any other necessary/appropriate data to television apparatus components. Software stored in EEPROM 1127 implements the operations described herein and/or as depicted in the figures. The received program information can be saved in the EEPROM 1127 or other non-volatile memories (not shown).

CPU 1112 controls functions included with in μP 1110 bus 1119 within the μP 1110. In particular, CPU 1112 controls auxiliary data processor 1115 and on-screen display (OSD) processor 1117. Auxiliary data processor 1115 extracts auxiliary data such as StarSight® data from video signal PIPV. Auxiliary data processor 1115 also extracts or obtains auxiliary data including program/programming, program/programming guide or electronic program guide (EPG) information from ATSC (American Television Systems Committee) PSIP (Program and System Information Protocol) data of one or more incoming ATSC television signals. Auxiliary data processor 1115 may also extract or obtains auxiliary data including program/programming, program/programming guide or electronic program guide (EPG) information from NTSC (National Television Systems Committee) VBI (vertical blanking interval) data of one or more incoming NTSC television signals. The various types, forms and/or formats of program/programming, program/programming guide or electronic program guide information or data is herein collectively termed EPG data.

A particular television channel (signal) may carry program or programming data specific only to programs for the particular channel or the particular channel and any of its sub-channels. Alternatively or additionally, a particular television channel (signal) may carry program or programming data for programs with respect to a plurality of television channels or television channels and their sub-channels. In one form, the present invention utilizes the receipt of updated EPG data (e.g. an updated EPG) to trigger display of program data or information regarding a next program for the currently tuned television channel (television channel being viewed). In another form, the present invention provides automatic display of next program information for a currently tuned channel from EPG data within a predetermined time period before the end of the current program. The present invention may utilize any one or type of EPG information/data in order to provide an on-screen display of at least some program information for a next program of a currently tuned or viewed television channel.

One form of an EPG is an interactive, on-screen display feature that displays information analogous to TV listings found in local newspapers or other print media. In addition, an EPG also includes information necessary for collating and decoding programs. An EPG provides information about each program with the time frames cover by the EPG which typically ranges from the next hour up to several days. The information contained in the EPG includes programming characteristics such as channel number, program title, start time, end time, elapsed time, time remaining, rating (if available), topic, theme and a brief description of the program's content. EPGs are usually arranged in a two-dimensional table or grid format with time information on one axis and channel information on the other axis. An example of a program guide is shown in FIG. 3.

Figure 3:
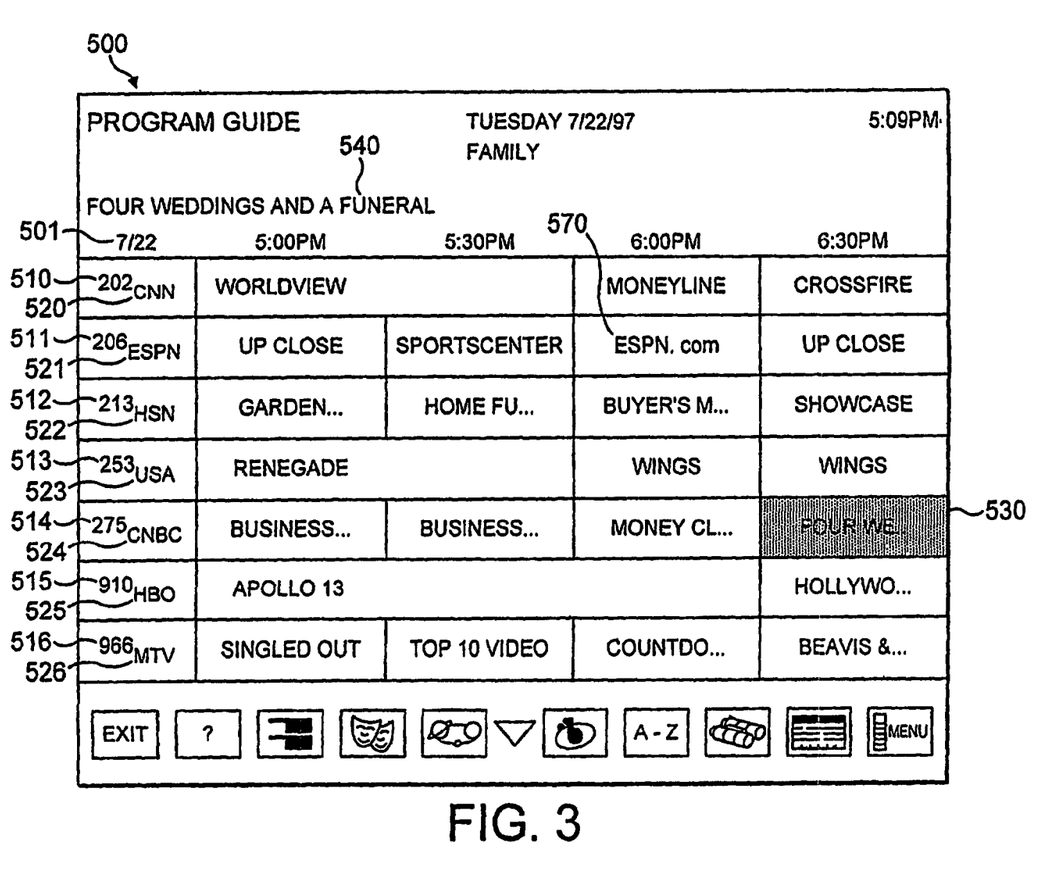
FIG. 3 provides a depiction of a portion of an exemplary program guide.

Referring to FIG. 3, it should be appreciated that an OSD processor/generator is responsible for generating a program guide such as the exemplary program guide 500 depicted in FIG. 3 typically under control of an advanced RISC (reduced instruction set computer) processor such as is known in the art. The program guide 500 (reflecting received program guide data) shows a program schedule in a time-and-channel format. One dimension (e.g. horizontal) of the guide shows the time information while the other dimension (e.g. vertical) of the guide shows the channel information. The time information is conveyed to the user by having a time line 501 on the top portion of the guide and is demarked by half-hour intervals or increments. The channel information is conveyed to the user by channel numbers 510-516 and corresponding channel station names 520-526. Any one or more of the program guide data as depicted in the guide 500 may be used for display when the automatic next program data display is triggered or activated.

Unlike non-interactive guides that reside on a dedicated channel and merely scroll through the current programming on the other channels for the next 2 to 3 hours, EPGs allow viewers to select any channel at any time during some period into the future, e.g. up to seven days forward. Further EPG features include the ability to highlight individual cells of the grid containing program information. Once highlighted, the viewer can perform functions pertaining to that selected program. For instance, the viewer could instantly switch to that program if it is currently being aired. Viewers could also program one touch video cassette recording (VCR) or the like if the television is properly configured and connected to a recording device.

In addition, U.S. Pat. No. 5,515,106 issued to Chaney et al., and assigned to the same assignee as the present invention, describes in detail an exemplary embodiment including data packet structure necessary to implement an exemplary program guide system. The exemplary data packet structure is designed so that both the channel information (e.g., channel name, call letters, channel number, type, etc.) relating to a program description information (e.g. content, title, rating, star, etc.) relating to a program may be transmitted from a program guide database provider to a receiving apparatus efficiently.

OSD processor 1117 operates in a conventional manner to produce R, G and B video signals that when provided on the display will produce a displayed image representing on-screen next program display data/information in accordance with the present principles. OSD processor 1117 also produces a control signal that is intended to control a fast switch for inserting signals in to the system's video output signal at times when an on-screen display is to be displayed. For example, when updated program guide information or program data is received for a currently tuned channel, either by active acquisition or by passive receipt thereof, CPU 1112 enables processor 1117. In response the processor 1117 produces signals representing the next program guide data information just extracted and stored in memory.

Video signal processor (VSP) 1155 performs conventional video signal processing functions, such as luma and chroma processing. Output signals from VSP 1155 are suitable for coupling to a display device 7 for producing the image. VSP also include a fast switch for coupling signals produced the OSD processor 1117 to the output video signal path at times when graphics and/or text is to be included in the displayed image. The fast switch is controlled by control signal FSW which is generated by OSD processor 1117 in main microprocessor 1110 at times when text and/or graphics are to be displayed.

The input signal for VSP 1155 is signal PIPV that is output by picture-in-picture (PIP) processor 1140. PIP processor 1140 provides PIP in a conventional manner using features included in unit 1140 such as a video switch, analog-to-digital converter (ADC), RAM and digital-to-analog converter (DAC).

Figure 4:
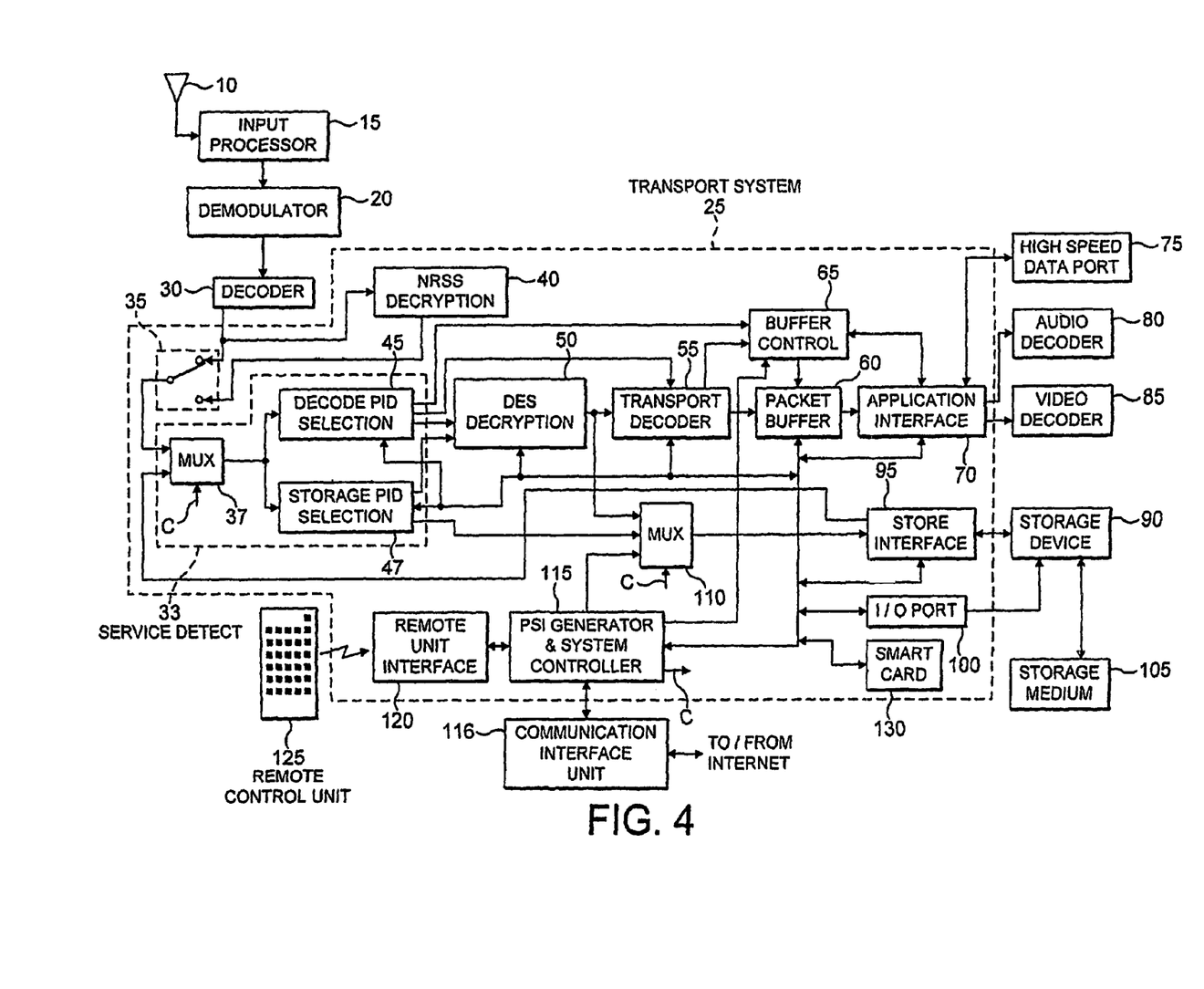
FIG. 4 shows a digital video and auxiliary data processing apparatus suitable for processing incoming digital video and auxiliary data for automatic display of next television program information for a television channel currently being viewed.

FIG. 4 shows another example of an electronic device capable of receiving television signals including auxiliary data such as program data and utilizing the auxiliary data to effect display of current and/or next program information for a tuned television channel in accordance with the principles of the subject invention. As described below, the exemplary system shown in FIG. 4 is an MPEG compatible system for receiving MPEG encoded transport streams representing broadcast (over-the-air, satellite and/or cable) programs. The term 'program' is used to represent any form of packetized data.

Video and audio decoders 85 and 80 respectively, decode the compressed data from system 25 to provide outputs for display. Data port 75 provides an interface for communication of the compresses data from system 25 to other devices such as a computer of High Definition Television (HDTV) receiver, for example. Considering FIG. 4 in detail, a carrier modulated with video and auxiliary data received by antenna 10 (or other source/input for the processing apparatus) is converted to digital form and processed by input processor 15. Processor 15 includes radio frequency (RF) tuner and intermediate frequency (IF) mixer and amplification stages for down-converting the input video signal to a lower frequency band suitable for further processing as necessary. The resultant digital output signal is demodulated by demodulator 20 and decoded by decoder 30. The output from decoder 30 is further processed by transport system 25.

Multiplexer (mux) 37 of service detector 33 is provided, via selector 35, with either the output from decoder 30, or the decoder 30 output further processed by a descrambling unit 40 such as a smart card system. The data provided to mux 37 from selector 35 is in the form of an MPEG compliant packetized transport datastream as defined in MPEG systems standard section 2.4 and includes program/program guide data and the data content of one or more program channels. The individual packets that comprise particular program channels are identified by Packet Identifiers (PIDs). The transport stream contains Program Specific Information (PS) for use in identifying the PIDs and assembling individual data packets to recover the content of all the program channels that comprise the packetized datastream. The received program guide data can be saved in a storage medium 105 via a storage interface 95 and a storage device 90. Transport system 25, under the control of the system controller 115, receives, acquires and collates program guide information from the input transport stream, storage device 90 or an internet service provider via the communication interface unit 116. This data may be stored for comparison by or with acquired or received new or next program guide data. The individual packets that comprise either particular program channel content or Program Guide Information, are identified by their Packet Identifiers (PIDs) contained within header information. The program data may include one of more data fields such as title, star, rating, etc. related to a program.

The user interface incorporated in the video receiver shown in FIG. 4 enables a user to activate various features by selecting a desired feature from an on-screen display (OSD) menu. The OSD menu includes the ability for the user to disable and enable the automatic display of next program information. The OSD menu may also allow user selection of various options with respect to such display of next program information. Data representing information displayed in the OSD menu and the OSD next program information/next program information display is generated by system controller 115 in response to stored on-screen display (OSD) information representing text/graphics, stored program guide information, and/or program guide and text/graphics information received via the input signal as described herein and in accordance with exemplary control programs to be shown in FIGS. 6 and 7 and to be discussed below. The software control programs may be stored, for example, in embedded memory (not shown) of system controller 115.

Units 45 and 47 employ PID detection filters that match the PIDs of incoming packets provided by mux 37 with PID values pre-loaded in control registers within units 45 and 47 by controller 115. The pre-loaded PIDs are used in units 45 and 47 to identify the data packets that are to be stored and the data packets that are to be decoded for use in providing a video image. The pre-loaded PIDs are store in look-up table in units 45 and 47.

The packets provided by units 45 and 47 to unit 50 are encrypted using an encryption technique such as the Data Encryption, Standard (DES) defined in Federal Information Standards (FIPS) Publications. Unit 50 decrypts the encrypted packets using corresponding encryption keys provided by units 45 and 47 by applying decryption techniques appropriate for the selected encryption algorithm. Unit 60 contains four packet buffers accessible by controller 115. One of the buffers is assigned to hold data destined for use by controller 115 and the other three buffers are assigned to hold packets that are destined for use by application devices 75, 80 and 85. Access to the packets stored in the four buffers within unit 60 by both controller 115 and by application interface 70 is controlled by buffer control unit 65. The non-encrypted and decrypted packets provided by units 45 and 50 by decoder 55 contain a transport header as defined in MPEG systems standards. Decoder 55 determines from the transport header whether the non-encrypted and decrypted packets contain an adaptation field (per the MPEG systems standard).

Packets received by decoder 55 from units 45 and 50 that contain program content including audio, video, caption and other information, are directed by unit 65 from decoder 55 to the designated application device buffers in packet buffer 60. Application control unit 70 sequentially retrieves the audio, video caption and other data from the designated buffers in buffer 60, which may provide the data to corresponding application devices 75, 80 and 85.

Packets that contain PSI information that are recognized by unit 45 as destined for the controller 115 buffer in unit 60. The PSI packets are directed to this buffer by unit 65 via units 45, 50 and 55 in a similar manner to that described for packets containing program content. Controller 115 reads the PSI from unit 60 and stores it in internal memory. Controller 115 also generates condensed PSI (CPSI) from the stored PSI and incorporates the CPSI in a packetized datastream suitable for storage on a selectable storage medium. Other functions and/or features are apparent.

Figure 5:
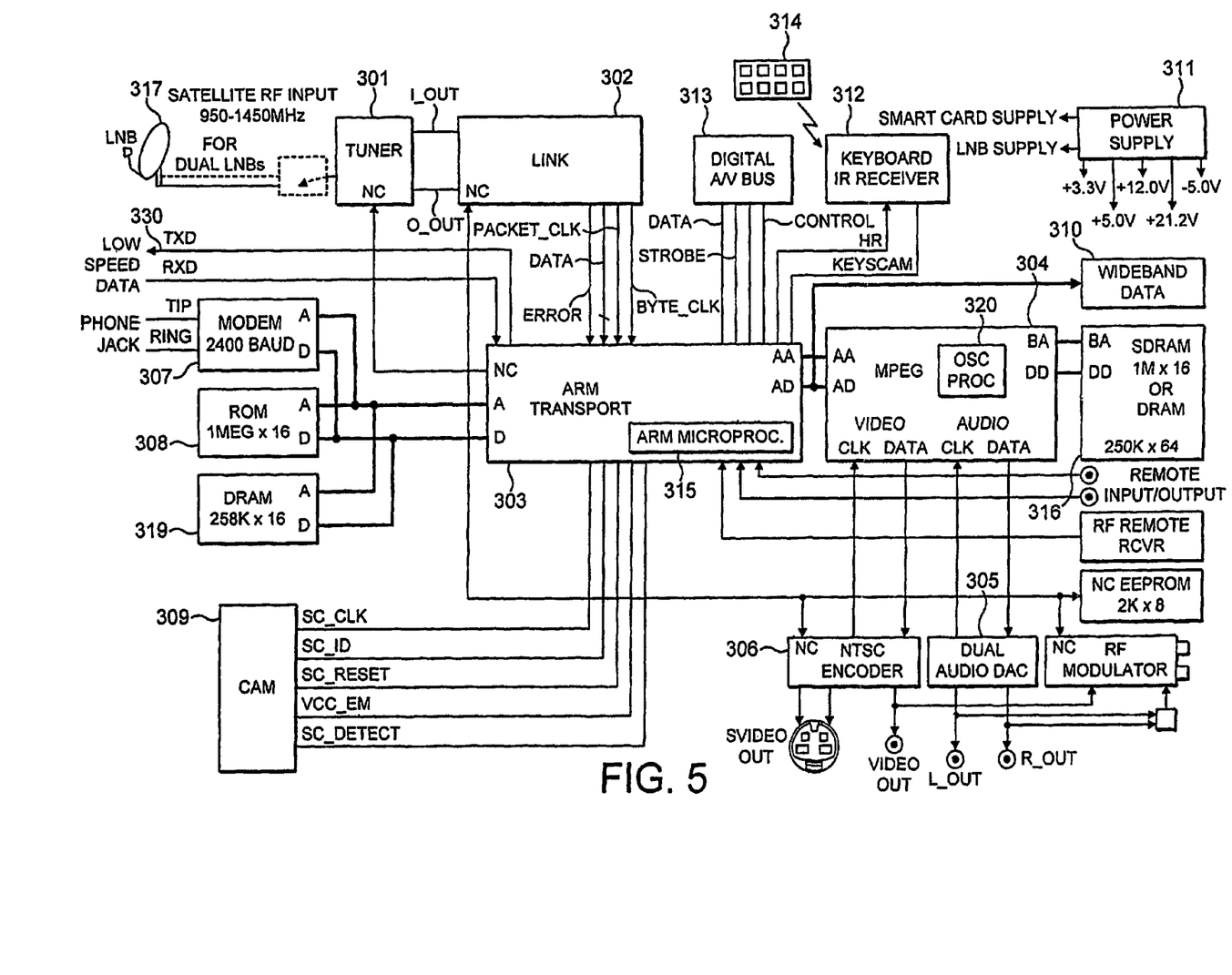
FIG. 5 shows a block diagram of a specific implementation of a digital satellite system suitable for processing digital video and auxiliary data processing apparatus suitable for processing the incoming digital video and auxiliary data for automatic display of next program information for a television channel currently being viewed.

FIG. 5 is a specific implementation of an electronic device generally shown in FIG. 2. FIG. 5 represents a satellite receiver set-top box, designed and manufactured by Thomson Consumer Electronics, of Indianapolis, Ind., USA, for receiving DirecTV™ satellite service provided by Hughes Electronics.

As shown, in FIG. 5, the set-top box has a tuner 301 that receives and tunes applicable satellite RF signals from a satellite antenna 317. The tuned signals are outputted to a link module 302 for further processing. Link module 302 is responsible for further processing of the tuned signals I_out and Q_out from tuner 301, including filtering and conditioning of the signals, and conversion of the signals into a digital output signal, DATA. The link module 302 is implemented as an integrated circuit (IC).

The digital output, DATA, from the link module 302 consists of a compliant packetized data stream recognized and processable by the transport unit 303. The datastream includes program guide data/information and the data content or one or more program channels of the satellite broadcast service from DirecTV™. Program guide data contains information relating to the type of program. The function of the transport unit 303 is the same as the transport system 25 of FIG. 4. As discussed, the transport unit 303 processes the packetized data stream according to the Packet Identifiers (PID) contained in the header information. The processed data stream is then formatted into MPEG compatible, compressed audio and video packets and coupled to a MPEG decoder 304 for further processing.

The transport unit 303 is controlled by an Advanced RISC Microprocessor (ARM) 315 which is a RISC based microprocessor. The ARM processor 315 executes control software residing in ROM 308 using DRAM 319 for storing intermediate results generated during control software execution. Exemplary components of the software may be, for example, control programs shown in FIGS. 6 and 7 for processing and/or using program guide data and displaying OSD information relative to next program data in accordance with the present principles. The transport unit 303 is typically implemented as an integrated circuit. For example, a preferred embodiment is an IC manufactured by SGS-Thomson Microelectronics.

The MPEG compatible, compressed audio and video packets from the transport unit 303 are delivered to an MPEG decoder 304. The MPEG decoder decodes the compressed MPEG datastream from the transport unit 303. The decoder 304 then outputs the applicable audio stream which can be further processed by the audio digital-to-analog converter (DAC) 305 to convert the digital audio data into analog sound.

The decoder 304 also outputs application digital video data which represents image pixel information to a NTSC encoder 306. The NTSC encoder 306 then further processes this video data into NTSC compatible analog video signal so that video images may be displayed on a regular NTSC television screen. The MPEG decoder also provides the decoded program data. The MPEG decoder may be implemented as an integrated circuit. One exemplary embodiment may be an MPEG decoder IC manufactured by SGS-Thomson Microelectronics.

Included in the MPEG processor 34 is an OSD processor 320. The OSD processor 320 reads data from SDRAM 316 which contains stored OSD information. OSD information corresponds to bitmap OSD graphics/text images. The OSD processor is capable of varying the color and/or translucency of each pixel of an OSD image under the control of the ARM microprocessor 315 in a conventional manner.

Figure 6:
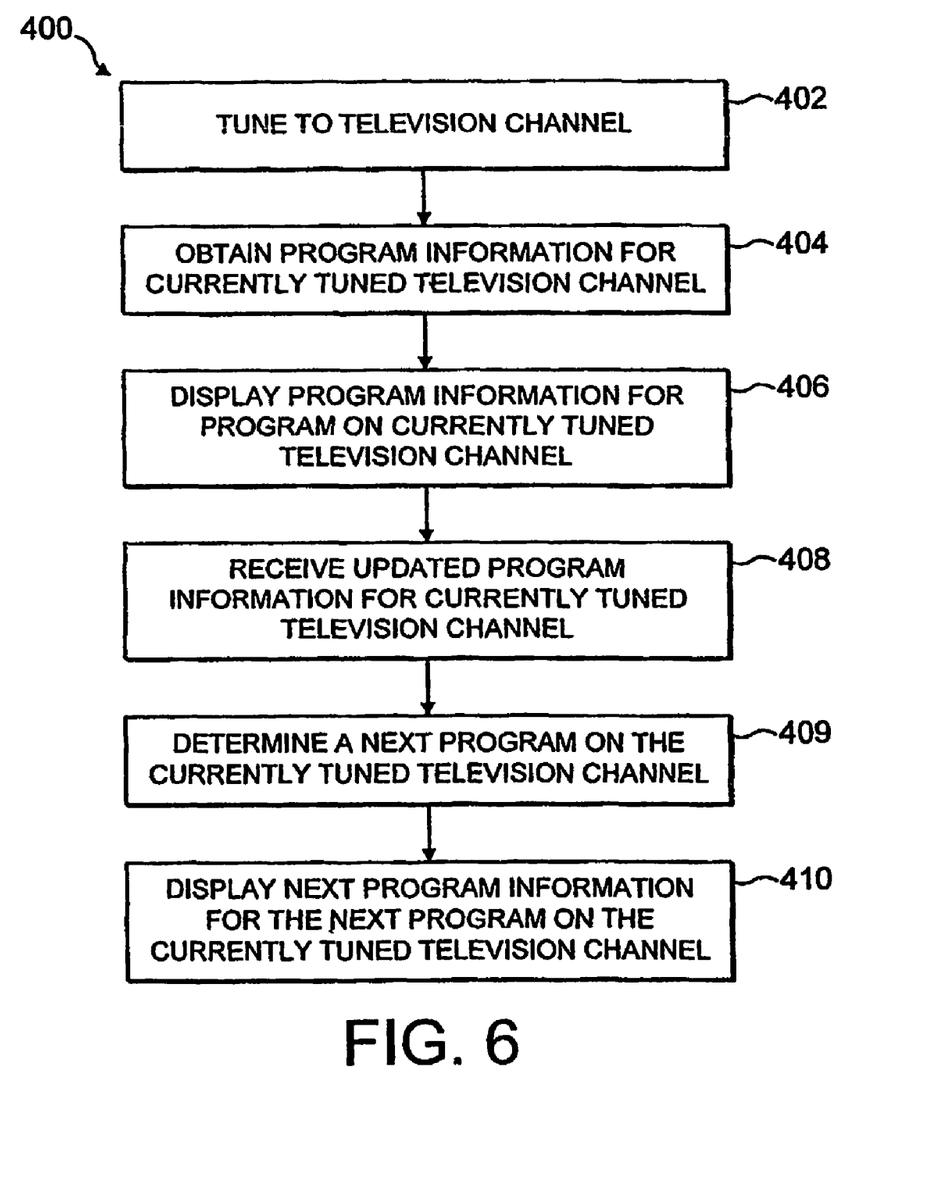
FIG. 6 is an illustrative flow chart depicting an exemplary manner of operation of a television apparatus in accordance with the present principles, particularly relating to the display of television program information for a currently tuned television channel.

FIG. 6 shows an exemplary control program in flow chart form, generally designated 400, which may be executed by either the CPU 1112 of FIG. 2, the controller 115 of FIG. 4, or the ARM microprocessor 315 of FIG. 5 to implement the features according to the present invention. A person skilled in the art would readily recognize that these control programs when executed by any one of the systems described in the figures will provide the same features in accordance with the present invention.

The program/flow chart 400 begins at block 402 wherein the television apparatus is tuned to a television channel. This may be in response to a user command or from an automatic or generated command by the television apparatus or an external, component in communication with the television apparatus. As provided in block 404, during tuning of a television channel and/or shortly thereafter, program data or information is obtained for a current program provided on the particular tuned television channel. The programs data may be provided in the television signal for the television channel or may be provided in another television channel signal. In any case, program information for the currently tuned television channel may be displayed as provided in block 406. This is typically accomplished automatically. Moreover, such information is typically displayed for only a particular time period.

In block 408, updated program information for programs on the currently tuned television channel is received. In block 409, the television apparatus determines a next program on the currently tuned television channel. The receipt of updated program information may be either automatic (i.e. pushed to the television apparatus), or is obtained or acquired by the television apparatus such as within a time interval before the end of a current program on a currently tuned television channel. In block 410, in response to the receipt of updated program information, next program information for a next television program on the currently tuned television channel is displayed. Display of the next program information is provided for a default period of time, or for a user-selectable period of time via an on-screen menu. Other options such as how long before the end of a current program should the next program information start to be displayed, whether or not it should be displayed at all (enable/disable), and otherwise.

Figure 7:
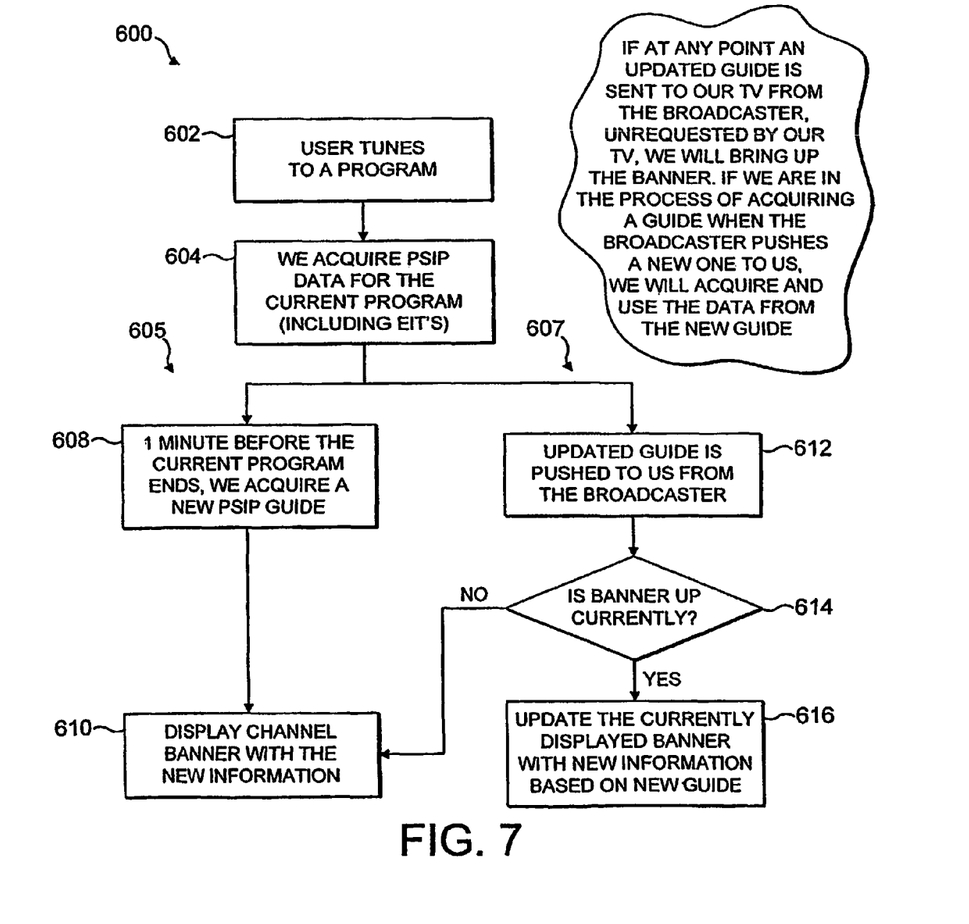
FIG. 7 is an illustrative flow chart depicting an exemplary manner relating to how a television apparatus displays program information for a next program on a television channel during current viewing of the television channel in accordance with the principles of the invention.

FIG. 7 shows another exemplary control program in flow chart form, generally designated 600, which may be executed by either the CPU 1112 of FIG. 2, the controller 115 of FIG. 4, or the ARM microprocessor 315 of FIG. 5 to implement the features according to the present invention. A person skilled in the art would readily recognize that these control programs when executed by any one of the systems described in the figures will provide the same features in accordance with the present invention. The program/flow chart 600 provides a specific manner of implementation of the principles of the subject invention, particularly with respect to television signals for television programs/channels in the ATSC format.

The program/flow chart 600 begins at block 602 wherein a user tunes to a program being provided on the program receiver. In block 604, PSIP data for the current program (including EITs) is acquired. The PSIP data is used to provide current program information display and to determine whether updated program information has been received. As indicated in FIG. 7 with respect to the flowchart 600, updated program information or an updated program guide is sent to the television apparatus from the broadcaster. This is un-requested by the television apparatus.

In branch 605 of the flow chart 600, however, un-requested updated program information/guide data has not been received. Then from block 604, block 608 is executed. Within a time period, here indicated as one (1) minute, before the current program ends, new PSIP data is acquired. The time period may be selectable by the user via an on-screen menu. Thereafter, in block 610, a channel/program banner containing new or next program information is then displayed.

In branch 607 of the flow chart 600, un-requested updated program information/guide data has been automatically received by the television apparatus. Particularly, in block 612, updated guide information is pushed to the television apparatus by the broadcaster. In response thereto, the television apparatus determines, in block 614, whether the program banner is currently being displayed (up). If the banner is currently being displayed (YES) then in block 616, the banner information currently being displayed is updated to reflect next program information for the particular television, channel. If, in block 614, the banner is not currently being displayed (NO) then program flow proceeds to block 610 as described above.

While this invention has been described as having a preferred design, the present invention can be further modified within the spirit and scope of this disclosure. This application is therefore intended to cover any variations, uses, of adaptations of the invention using its general principles. Further, this application is intended to cover such departures from the present disclosure as come within known or customary practice in the art to which this invention pertains and that fall within the limits of the appended claims.

The invention claimed is:

1. A method for operating a television apparatus having a processor, the method comprising steps of:
    tuning a channel;
    receiving an updated program guide from a broadcaster while said channel is tuned, wherein said updated program guide is provided from said broadcaster without being requested by said television apparatus;
    in response to receiving said updated program guide, said processor determining if a banner advertising a future program on said channel is currently displayed while said channel is tuned;
    in response to determining that said banner is currently displayed while said channel is tuned, said processor performing a first function while said channel is tuned; and
    in response to determining that said banner is not currently displayed while said channel is tuned, said processor performing a second function different from said first function while said channel is tuned.

2. The method of claim 1, further comprising a step of requesting said updated program guide from said broadcaster a predetermined time period before a detected end time of a currently tuned program.

3. The method of claim 1, wherein said banner includes at least one of: a title of said future program, a starting time of said future program, and a duration of said future program.

4. The method of claim 3, wherein said future program is a next program on a currently tuned channel.

5. The method of claim 1, wherein said first function includes updating said currently displayed banner with new information based on said updated program guide.

6. The method of claim 2, wherein said predetermined time period is selected by a user of said television apparatus.

7. The method of claim 1, wherein said second function includes enabling display of said banner based on said updated program guide.

8. A television apparatus, comprising:
    means for tuning a channel;
    a processor receiving an updated program guide from a broadcaster while said channel is tuned, wherein said updated program guide is provided from said broadcaster without being requested by said television apparatus; and
    said processor determining if a banner advertising a future program on said channel is currently displayed while said channel is tuned in response to receiving said updated program guide; and wherein:
    if said processor determines that said banner is currently displayed while said channel is tuned, a first function is performed while said channel is tuned; and
    if said processor determines that said banner is not currently displayed while said channel is tuned, a second function different from said first function is performed while said channel is tuned.

9. The television apparatus of claim 8, further comprising said processor requesting said updated program guide from said broadcaster a predetermined time period before a detected end time of a currently tuned program on said channel.

10. The television apparatus of claim 8, wherein said banner includes at least one of: a title of said future program, a starting time of said future program, and a duration of said future program.

11. The television apparatus of claim 8, wherein said future program is a next program on said channel.

12. The television apparatus of claim 8, wherein said first function includes updating said currently displayed banner with new information based on said updated program guide.

13. The television apparatus of claim 9, wherein said predetermined time period is selected by a user of said television apparatus.

14. The television apparatus of claim 13, wherein said second function includes enabling display of said banner based on said updated program guide.

15. A television apparatus, comprising:
    a tuner operative to tune a channel;
    an input operative to receive an updated program guide from a broadcaster while said channel is tuned, wherein said updated program guide is provided from said broadcaster without being requested by said television apparatus; and
    a controller operative to determine if a banner advertising a future program on said channel is currently displayed while said channel is tuned in response to reception of said updated program guide; and wherein:
    if said controller determines that said banner is currently displayed while said channel is tuned, a first function is performed while said channel is tuned; and
    if said controller determines that said banner is not currently displayed while said channel is tuned, a second function different from said first function is performed while said channel is tuned.

16. The television apparatus of claim 15, further comprising means for requesting said updated program guide from said broadcaster a predetermined time period before a detected end time of a currently tuned program on said channel.

17. The television apparatus of claim 15, wherein said banner includes at least one of: a title of said future program, a starting time of said future program, and a duration of said future program.

18. The television apparatus of claim 15, wherein said first function includes updating said currently displayed banner with new information based on said updated program guide.

19. The television apparatus of claim 16, wherein said predetermined time period is selected by a user of said television apparatus.

20. The television apparatus of claim 19, wherein said second function includes enabling display of said banner based on said updated program guide.

* * * * *